July 17, 1923.
A. E. BAUMAN
SPRING TIRE
Filed May 15, 1922  3 Sheets-Sheet 1
1,462,440
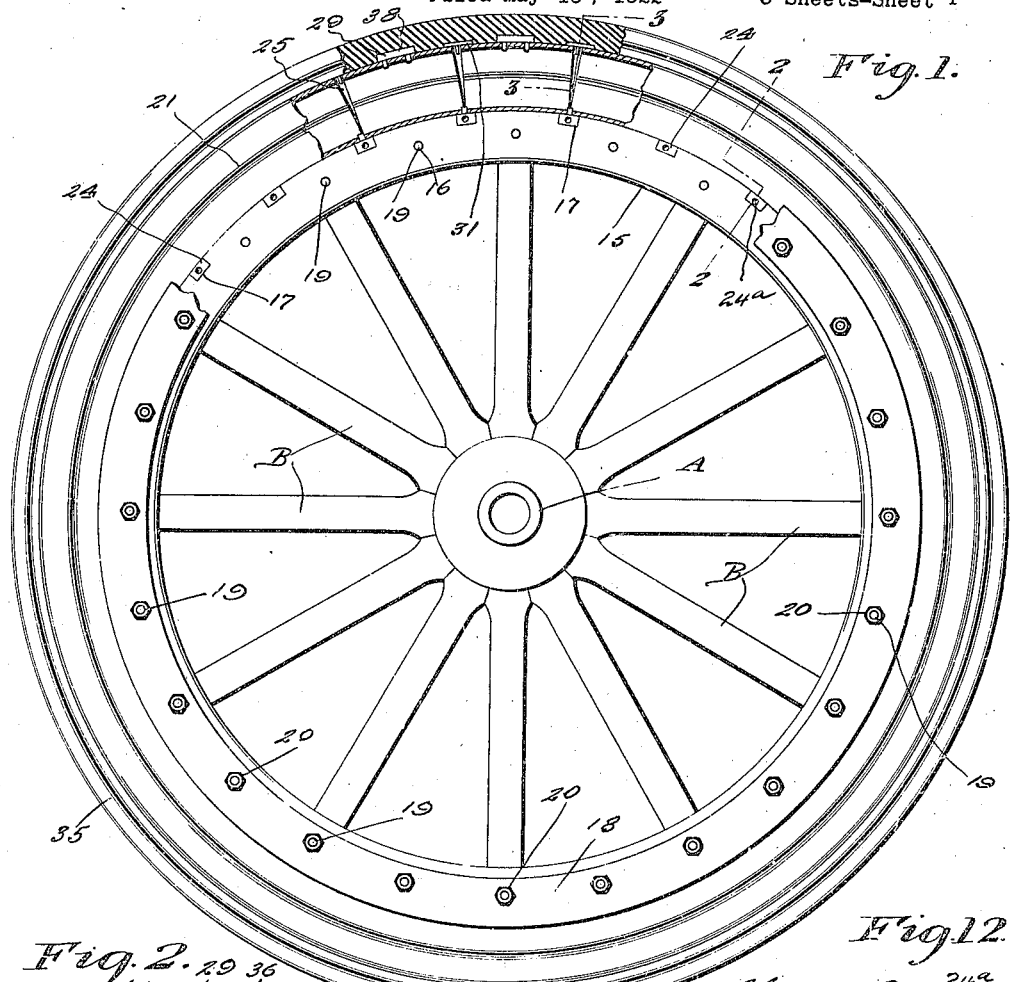
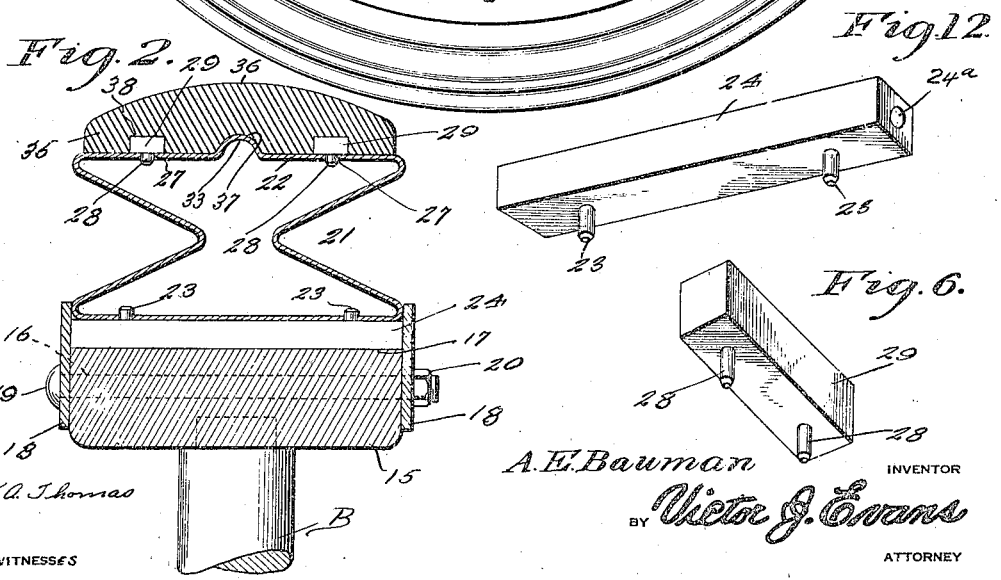
A. E. Bauman INVENTOR July 17, 1923.
A. E. BAUMAN
SPRING TIRE
Filed May 15, 1922
1,462,440
3 Sheets-Sheet 2
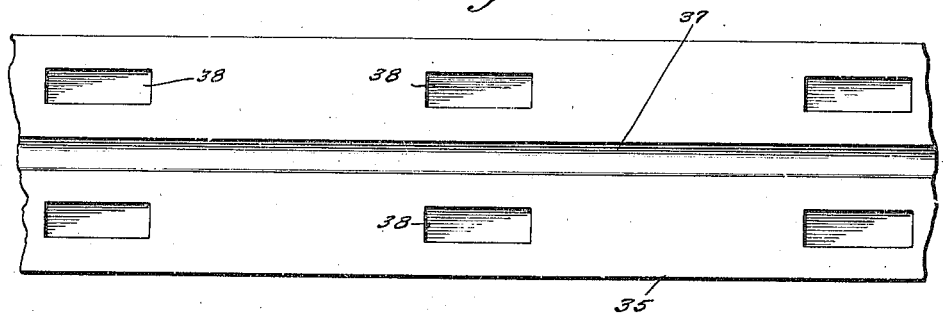
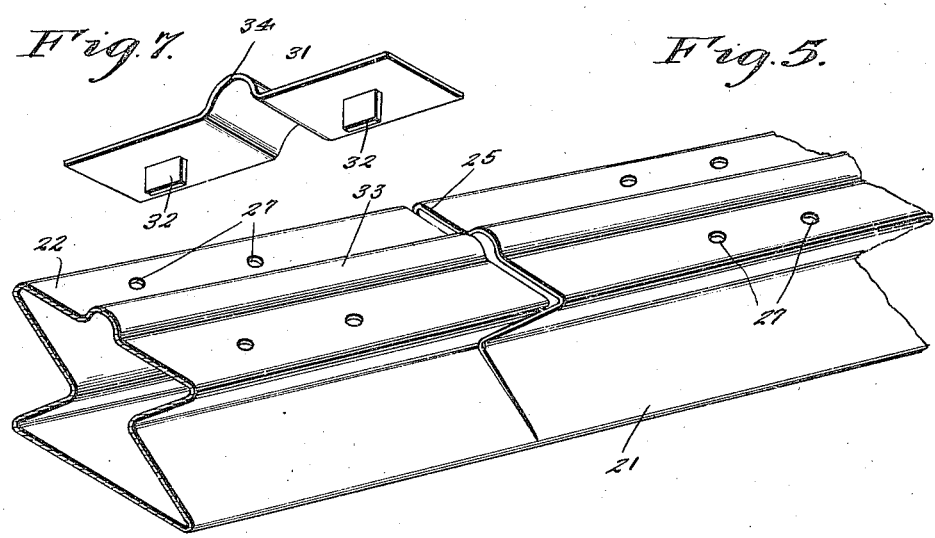
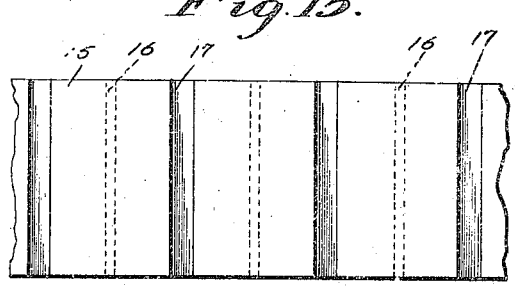
A. E. Bauman INVENTOR
BY *Victor J. Evans*
WITNESSES ATTORNEY

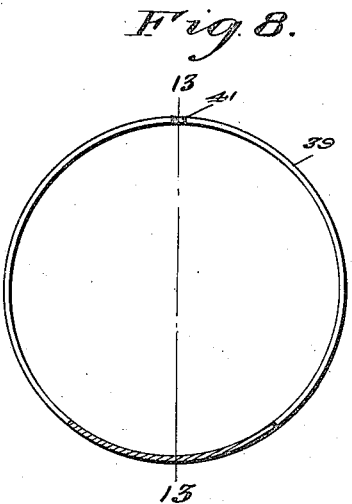
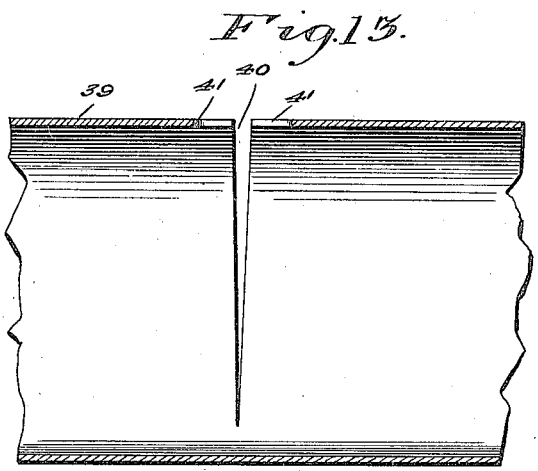
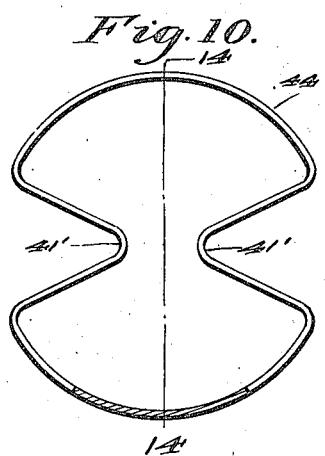
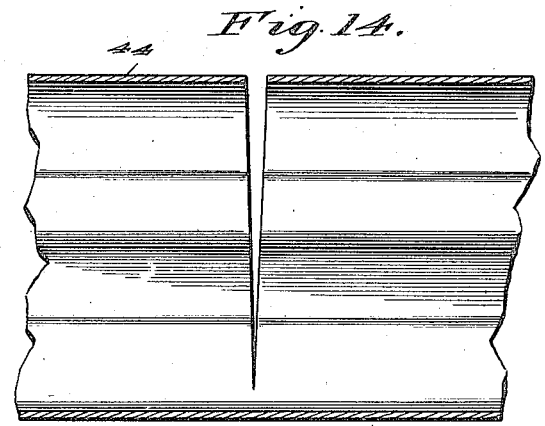
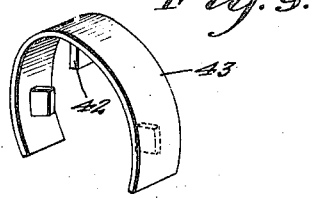
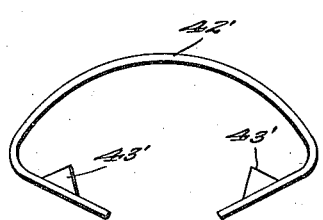

Patented July 17, 1923.

1,462,440

UNITED STATES PATENT OFFICE.

ARTHUR E. BAUMAN, OF AKRON, OHIO.

SPRING TIRE.

Application filed May 15, 1922. Serial No. 560,998.

*To all whom it may concern:*

Be it known that I, ARTHUR E. BAUMAN, a citizen of the United States, residing at Akron, in the county of Summit and State of Ohio, have invented new and useful Improvements in Spring Tires, of which the following is a specification.

This invention relates to resilient tires for vehicles and has for its object the provision of a novel tire structure having a peculiar spring built thereinto and co-operating with a solid or cushion tire proper which forms the ground engaging portion of the device.

An important object is the provision of a tire of this character which includes an annular spring member of peculiar formation which provides the necessary resilience and which is slit at intervals to prevent binding or interference with the action, novel means being provided for covering the slits for the purpose of preventing chafing of the interior surface of the tread member in action.

Still another object is the provision of novel means for preventing circumferential creeping or lateral displacement of the tread member with respect to the spring.

An additional object is the provision of a tire of this character which will be simple and inexpensive in manufacture, efficient and durable in service, and a general improvement in the art.

With the above and other objects and advantages in view, the invention consists in the details of construction to be hereinafter more fully described and claimed, and illustrated in the accompanying drawings, in which:

Figure 1 is a side elevation of the complete tire mounted upon a wheel, parts being broken away and in section, Figure 2 is a cross sectional view taken on the line 2—2 of Figure 1, Figure 3 is a cross sectional view taken on the line 3—3 of Figure 1, Figure 4 is an inside plan view of a portion of the tread member, Figure 5 is a detail perspective view of a portion of the spring member, Figure 6 is a detail perspective view of one of the retaining blocks, Figure 7 is a perspective view of one of the slit covers, Figure 8 is a cross section through a modification, Figure 9 is a perspective view of the slit cover used in Figure 8, Figure 10 is a cross section through still another modification, Figure 11 is a detail view of the slit cover used therein, Figure 12 is a detail perspective view of one of the blocks filling the recesses in the felly and which constitute the driving connection, Figure 13 is a longitudinal section through a modified form, the view being taken on the line 13—13 of Figure 8, Figure 14 is a section on the line 14—14 of Figure 10 and Figure 15 is a fragmentary plan view of the felly.

Referring more particularly to the drawings the letter A designates a wheel hub from which radiate spokes B carrying a felly 15 which is provided throughout its circumference with a plurality of holes 16 and which has its outer surface or periphery formed with transverse recesses 17 spaced equally apart. Disposed against opposite sides of this felly are ring members 18 held in place by bolts 19 which pass transversely through the holes 16 and which carry the usual nuts 20 for securing the ring members to the felly.

Located within the channel formed by the felly and the ring members is a spring 21 which is of peculiar cross sectional shape as shown and which includes an annular outer peripheral portion 22 constituting a band for supporting the tread member to be described. The opposite sides or edges of this spring member are V-shaped and extend toward each other as clearly disclosed. Secured upon the inner periphery of the spring, as by means of pins 23, are blocks 24 which fit within the recesses 17 of the felly, and which serve to provide a driving connection between the wheel and the spring. The blocks 24 are formed with holes 24ª extending therethrough within which may be engaged wires or the like for effecting contraction of the spring when the tire is being applied. At spaced intervals the spring is slit as shown at 25. The band portion 22 of the spring is also formed at intervals with pairs of holes 27 which are for the passage of pins 28 which project from blocks 29 arranged in pairs along the periphery of the band portion.

Located at each slit in the spring is a slit cover formed as a transverse member 31 provided at its underside with lugs 32 which fit within the slits 25 with sufficient looseness to permit play of the sections of the spring between the slits so as not to interfere with the resilience. It will be observed that the center of the band portion 22 of the spring is formed with an outwardly extending bead 33 which is semi-circular in cross section and which fits within a corresponding bead 34 in the slit cover.

The numeral 35 designates the tread member which is formed of solid rubber and which preferably has its outer periphery 36 curved as shown. The inner periphery of this tread member is formed with a groove 37 which receives the bead 33 of the spring and also the beads 34 on the slit covers. The inner periphery of the tread member is also formed with spaced pairs of cavities 38 which receive the blocks 29, these blocks operating to prevent circumferential creeping and lateral displacement of the tread member.

After the wheel has been constructed and assembled as above described it will be apparent that great resilience will be attained owing to the provision of the peculiarly constructed spring member. It is to be noted that the tire will be advantageous in use as it is puncture proof and contains no inner tube which is so productive of tire trouble the present device being not subject to blow outs and the like.

In Figure 8 I have shown a spring member 39 which is circular in cross section and which is designed for use inside of an ordinary tire casing instead of using the cushion tire structure as above described. This spring member 39 is transversely slit as shown at 40 in the same manner as the spring 21 with its ends formed with notches 41 for the reception of lugs 42 on slit covers 43 which are curved to conform to the shape of the spring. This form of the device replaces the ordinary pneumatic tube commonly employed in tires.

In Figures 10 and 11 I have shown substantially the same structure as in Figures 8 and 9 except that the spring 44 while circular in general contour has its sides pressed inwardly as indicated at 41'. This form is provided with slits similar to the slits 40 and which are covered by members 42' having lugs 43' projecting into the slits. This form of the device is used in exactly the same manner as in the form shown in Figures 8 and 9 and has the same advantages.

From the foregoing description and a study of the drawings it will be apparent that I have thus provided a simply constructed and consequently inexpensive resilient tire which will be highly efficient in assuring easy riding qualities and which will have the maximum durability combined with cheapness of manufacture.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. In combination, a felly having its outer periphery formed with transverse recesses, ring members secured upon opposite sides of the felly and defining a channel, a spring fitting within said channel and carrying projections fitting within said recesses, and a cushion tire carried by said spring member.

2. In combination, a felly having its outer periphery formed with transverse recesses, ring members secured upon opposite sides of the felly and defining a channel, a spring fitting within said channel, blocks fitting within said recesses and carrying outwardly extending pins engaged through holes in the spring member, and a cushion tire carried by the spring member.

3. In a spring tire construction, a spring member carried by a felly of a wheel, the spring member being slit transversely at intervals, a cushion tire surrounding the spring member, and projecting members carried by the tire and engaging within the slits.

4. In a spring tire construction, a spring member secured upon the felly of a wheel and slits transversely at intervals, the outermost portion of said spring member being formed with a longitudinal rib, a correspondingly shaped plate member located over each slit and carrying projections fitting therein, a cushion tire having a longitudinal groove on its inner periphery fitting upon said spring member, the groove receiving said rib.

5. In a spring tire construction, a spring member secured upon a felly of the wheel and including outer and inner portions connected by indented sides, said spring member being transversely slit at intervals, and a cushion tire carried by said spring member.

6. In a spring tire construction, a spring member secured upon a felly of the wheel and including outer and inner portions connected by indented sides, said spring member being transversely slit at intervals, and a cushion tire carried by said spring member, and a plate member disposed upon the spring member at each slit therein and formed with lugs fitting in the slit.

7. In a spring tire construction, a spring member including outer and inner portions connected by indented sides, the outer portion being formed at intervals with spaced holes, blocks fitting upon the spring member and carrying pins fitting within the respective holes, and a cushion tire surrounding the spring member.

In testimony whereof I affix my signature.

ARTHUR E. BAUMAN.